(12) United States Patent
Oliver (10) Patent No.: US 8,572,731 B1
(45) Date of Patent: Oct. 29, 2013

(54) SYSTEMS AND METHODS FOR BLOCKING A DOMAIN BASED ON THE INTERNET PROTOCOL ADDRESS SERVING THE DOMAIN

(75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/298,494

(22) Filed: Nov. 17, 2011

(51) Int. Cl.
*H04L 29/06* (2006.01)

(52) U.S. Cl.
USPC ............................................. 726/22; 726/23

(58) Field of Classification Search
USPC ................................................... 726/22, 23
See application file for complete search history.

(56) References Cited

U.S. PATENT DOCUMENTS

| 2005/0108568 | A1* | 5/2005 | Bussiere et al. ............. 713/201 |
| 2008/0184357 | A1* | 7/2008 | Drako et al. ..................... 726/11 |

* cited by examiner

*Primary Examiner* — Justin T Darrow
(74) *Attorney, Agent, or Firm* — Holland & Hart LLP (57) ABSTRACT

A computer-implemented method to block a domain based on an Internet Protocol (IP) address serving the domain is described. A trigger event on a first domain is detected. The IP address serving the first domain is identified. The identified IP address is compared with a list of IP addresses. The trigger event is blocked based on a determination that the identified IP address matches at least one IP address on the list.

18 Claims, 10 Drawing Sheets

SYSTEMS AND METHODS FOR BLOCKING A DOMAIN BASED ON THE INTERNET PROTOCOL ADDRESS SERVING THE DOMAIN

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is desirable to anyone who uses and relies on computers.

Computing systems may be part of a network, such as the Internet. The computing systems may access a number of Web sites and Web pages available on the Internet, such as inter-linked hypertext documents of the World Wide Web. Information accessed on a network may belong to a particular domain. For example, a particular domain on the World Wide Web. Devices that are part of the Internet may be assigned Internet Protocol (IP) addresses that identify the various devices interconnected on the global Internet network.

In some cases, malicious entities may use the domains on the Internet to solicit sensitive information regarding a user. For example, malicious Web sites may request a user to enter personal financial information. In addition, a malicious domain may infect a computing device by downloading a file infected with a virus. The consequence of malicious domains may result in personal information being compromised and/or the infection of computing devices from viruses or other types of malware.

SUMMARY

According to at least one embodiment, a computer-implemented method to block a domain based on an Internet Protocol (IP) address serving the domain is described. A trigger event on a first domain is detected. The IP address serving the first domain is identified. The identified IP address is compared with a list of IP addresses. The trigger event is blocked based on a determination that the identified IP address matches at least one IP address on the list.

In one embodiment, characteristics of the first domain may be analyzed based on the determination that the identified IP address matches at least one IP address on the list. A determination may be made as to whether the first domain is a malicious domain based on the analyzed characteristics. In one configuration, data relating to the first domain may be transmitted to a back-end server. The data may indicate whether the first domain is a malicious domain. In one example, a notification may be generated for a user indicating whether the first domain is a malicious domain.

In one embodiment, at least one additional domain accessed prior to the first domain may be identified. An IP address serving the addition domain may be identified. A determination may be made as to whether the IP address matches at least one IP address on the list. Further a determination may be made as to whether the additional domain is a malicious domain based on a determination that the IP address serving the additional domain matches at least one IP address on the list.

A computing device configured to block a domain based on an Internet Protocol (IP) address serving the domain is also described. The device includes a processor and memory in electronic communication with the processor. The device may further include a malicious entity detection module, stored in the memory. The malicious entity detection module may be configured to detect a trigger event on a first domain, and identify the IP address serving the first domain. The module may be further configured to compare the identified IP address with a list of IP addresses, and block the trigger event based on a determination that the identified IP address matches at least one IP address on the list.

A computer-program product for blocking a domain based on an Internet Protocol (IP) address serving the domain is also described. The computer-program product may include a non-transitory computer-readable medium having instructions thereon. The instructions may include code programmed to detect a trigger event on a first domain, and code programmed to identify the IP address serving the first domain. The instructions may further include code programmed to compare the identified IP address with a list of IP addresses, and code programmed to block the trigger event based on a determination that the identified IP address matches at least one IP address on the list.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing, a domain may be a group of computers and devices on a network that may be administered as a unit with common rules and procedures. Within the Internet, domains may be defined by Internet Protocol (IP) addresses. Devices sharing a common part of an IP address may be considered to be in the same domain. Domain names may be used to identify one or more IP addresses with a name that may be remembered and used in Uniform Resource Locators (URLs) to identify particular Web pages. An IP address is an identifier for a computer or device (such as a Web server) on a TCP/IP network. Because the Internet is based on IP addresses, and not domain names, each Web server uses a Domain Name System (DNS) server to translate domain names into IP addresses. In other words, each domain name is linked to or hosted by at least one IP address. A single IP address may host a number of different domains.

Web pages identified by particular domain names may be malicious. Malicious domains may request sensitive information from a user via a Web browser. When the sensitive information is entered in the Web page, the information may be transmitted to a device that is assigned the IP address that is identified by the domain name of the Web page. Blocking access to particular domains may be problematic as domains may be changed rapidly and often without an identifiable pattern.

In one example, an IP address may serve a high percentage of malware and scams. In other words, a high percentage of domains hosted by a particular IP address may be malicious. The IP address is a constant entity that may serve as an initial indicator of a suspicious domain (e.g., Web site or Web page). Blocking access to all domains hosted by a suspicious IP address, however, may result in false positives, because an IP address may be used to serve both non-malicious and malicious domains. The present systems and methods may analyze a domain to determine whether the domain is malicious when the IP address serving the domain is identified as being suspicious.

Figure 1:
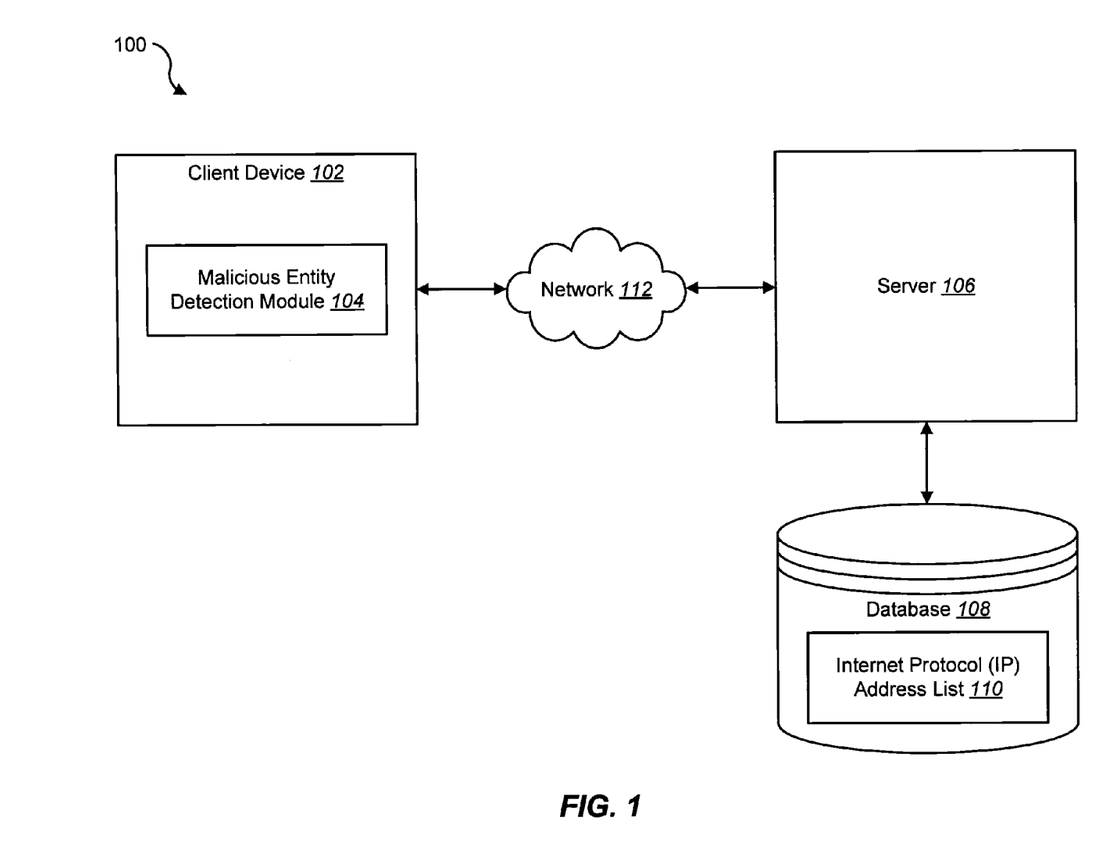
FIG. 1 is a block diagram illustrating one embodiment of an environment in which the present systems and methods may be implemented.

FIG. 1 is a block diagram illustrating one embodiment of an environment 100 in which the present systems and methods may be implemented. In one example, a client device 102 may communicate with a server 106 across a network 112. The client device 102 may include, but is not limited to, a personal computer (PC), a laptop, a tablet, a personal digital assistant (PDA), a smartphone, or any other type of computing device.

In one example, the client device 102 may include a malicious entity detection module 104. The module 104 may detect malicious entities that may be executing on the client device 102. Examples of malicious entities may include, but are not limited to, Web sites, Web pages, files, and the like. The server 106 may be communication with a database 108. In one embodiment, the server 106 may include the database 108. The database may include an IP address list 110. The list 110 may include a list of IP addresses that are known to be suspicious addresses. In other words, the list may include IP addresses that are known to serve malicious domains. In one configuration, the list 110 may be populated by an administrator. In addition, the list 110 may be dynamic. As a result, when new suspicious IP addresses are identified, they may be added to the list 110.

In one example, the malicious entity detection module 104 may identify an IP address that is serving a particular domain. The module 104 may compare the identified IP address to the addresses included in the IP address list 110. If the identified IP address is on the list 110, the module 104 may perform further analysis on the domain to determine whether the domain is malicious. Details regarding the malicious entity detection module 104 are described below.

Figure 2:
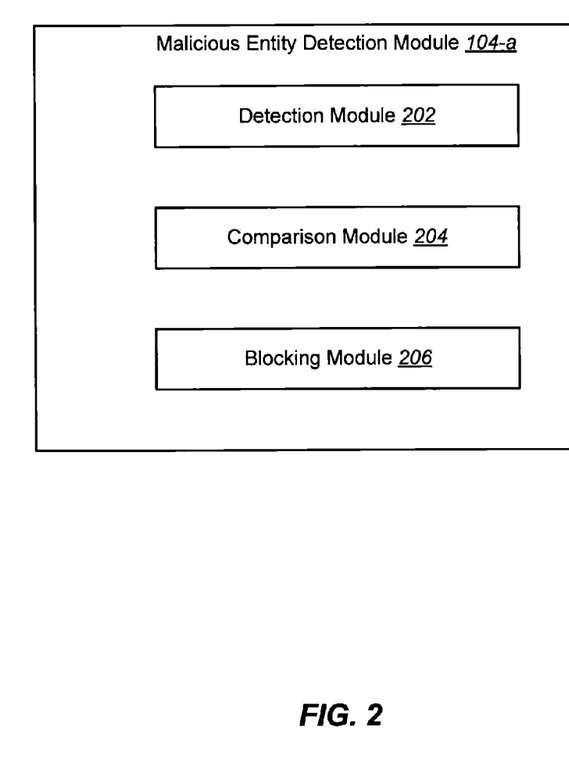
FIG. 2 is a block diagram illustrating one example, of a malicious entity detection module.

FIG. 2 is a block diagram illustrating one example, of a malicious entity detection module 104-a. The module 104-a may be an example of the malicious entity detection module 104 illustrated in FIG. 1. In one configuration, the module 104-a may include a detection module 202, a comparison module 204, and a blocking module 206.

In one embodiment, the detection module 202 may monitor a domain, such as a Web page, to detect the occurrence of a trigger event. Examples of a trigger event may include, but are not limited to, requests for sensitive information, file downloads, file transfers, and the like. Requests for sensitive information may include requests for credit card information, bank account numbers, routing numbers, social security numbers, or any other type of information that may be sensitive or financial in nature to a user. The comparison module 204 may identify the IP address serving the domain where the detection module detected the trigger event. The comparison module 204 may compare the identified IP address to IP addresses included on the IP address list 110. In one configuration, the comparison module 204 may determine whether the identified IP address matches an IP address included in the list 110.

In one example, the blocking module 206 may block the progress of the trigger event. For example, the trigger event may be a credit card number being inputted into a data field on a Web page. The blocking module 206 may block the transmission of the credit card number to the device that is assigned to the identified IP address. If the trigger event is a file download or file transfer, the blocking module 206 may terminate (or prevent) the download or transfer of the file.

Figure 3:
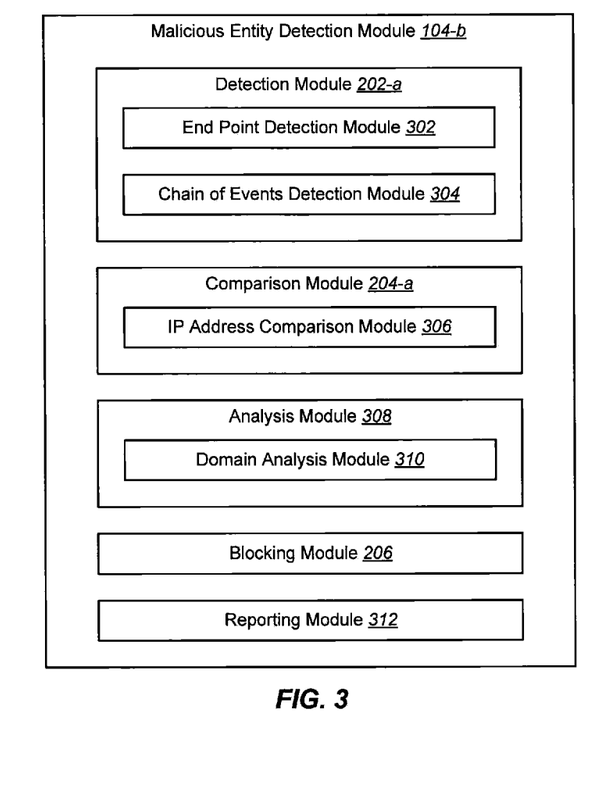
FIG. 3 is a block diagram illustrating one configuration of a malicious entity detection module.

FIG. 3 is a block diagram illustrating one configuration of a malicious entity detection module 104-b. The module 104-b may be an example of the module 104 of FIG. 1 or 2. In one embodiment, the module 104-b may include a detection module 202-a, a comparison module 204-a, an analysis module 308, a blocking module 206, and a reporting module 312.

In one example, the detection module 202-a may include an end point detection module 302. The module 302 may monitor a domain and detect the occurrence of an end point or triggering event. An example of an end point may be the detection of a data field requesting a user to input sensitive information (e.g., financial information, identification information, etc.). In addition, the end point may be the occurrence of a file download, file transfer, and the like to the domain. The detection module 202-a may further include a chain of events detection module 304. The module 304 may identify a chain of events that led to the end point. For example, the end point may be present on a first Web page. The chain of events detection module 304 may detect that a second and third Web page were accessed prior to the first Web page. In other words, the chain of events that led to the first Web page may include a user accessing the second Web page, then the third Web page, and then the first Web page. The chain of events detection module 304 may identify the domains that are included in the chain. The module 304 may also identify the IP addresses serving each of the domains in the chain. As a result, the module 304 may identify a chain of domains as well as a chain of IP addresses that led to the domain that includes the end point.

The comparison module 204-a may include an IP address comparison module 306. The module 306 may compare IP addresses identified by the detection module 202-a with the IP address list 112 stored in the database 110 at the server 106. The analysis module 308 may include a domain analysis module 310. When the IP address comparison module 306 identifies IP addresses in the chain of events that match addresses in the list 112, the domain analysis module 310 may further analyze domains served by these IP addresses to determine whether the domains are malicious. The analysis of the domains may include determining the geographic location of the domain with respect to the user, where the domain was registered, when the domain was registered, how long the domain has been registered, contact information for the domain, the type of information being requested of the user by the domain, the type of domain name server (DNS) used by the domain, the title of the DNS used by the domain, and the like.

In one embodiment, the blocking module 206 may block or prevent sensitive information requested by the domain from being transmitted to a device assigned the IP address that is serving the domain. The information may be blocked upon determining that the domain is malicious. For example, the analysis module 308 may determine a domain requesting credit card information is malicious. Alternatively, the analysis module 308 may determine that the domain requesting the information is non-malicious, but that another domain in the chain of events that led to the domain requesting the credit card information is malicious. As a result, the blocking module 206 may prevent the credit card information from being transmitted to the device assigned the IP address that is serving the domain requesting the information.

The reporting module 312 may report the results of the analysis module 308 to the server 106. The server 106 may store the results of the domain in the database 110 together with the list 112 of IP addresses. The reporting module 312 may also send a notification to a user regarding the analysis of the domain. For example, the notification may indicate that the domain (or a domain in the chain that the user previously accessed) may be malicious.

Figure 4:
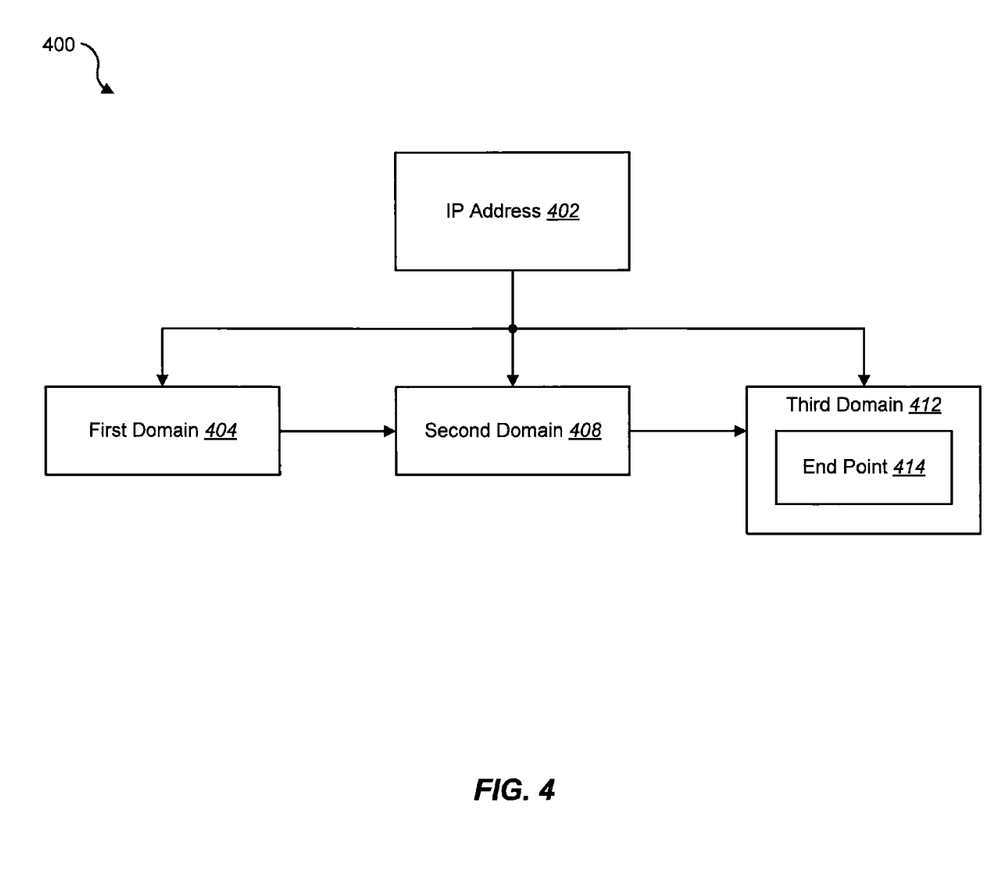
FIG. 4 is a block diagram illustrating one example of a chain of events that may be detected by the malicious entity detection module of FIG. 1, 2, or 3.

FIG. 4 is a block diagram illustrating one example of a chain of events 400 that may be detected by the malicious entity detection module 104 of FIG. 1, 2, or 3. In one embodiment, the chain of events 400 may be detected by the chain of events detection module 304 of FIG. 3.

In one configuration, a number of domains may be accessed. The domains may be, for example, Web sites or Web pages within a Web site. In one example, a Web browser may access a first domain 404, a second domain 408, and a third domain 412, in that order. The malicious entity detection module 104 may detect an end point 414 within the third domain 412. In one embodiment, the end point detection module 302 may detect the end point 414. The end point 414 may include a request for sensitive information from a user. For example, the third domain 412 may include a data field that requests a credit card number, a bank account number, or any other type of account number or financial information of the user. The end point 414 may also include a file download to the client device 102.

When the end point 414 is detected, the malicious entity detection module 104 may also identify a chain of events that led to the end point 414. In one example, the chain of events detection module 304 may identify previous domains that were accessed before the third domain 412 was accessed. In this example, the chain of events may include the first domain 404, followed by the second domain 408, and followed by the third domain 412. The chain of events may include more or less than three domains illustrated in FIG. 4.

Upon identifying the chain of events that led to the end point 414, the malicious entity detection module 104 may identify an IP address 402 that is serving each domain in the chain. In this example, the IP address 402 may be serving the first domain 404, the second domain 408, and the third domain 412. The module 104 may identify the IP address serving the event in the chain that includes the end point 414 (i.e., the third domain 412). The module 104 may determine whether the IP address 402 is included in the IP address list 112 that lists suspicious IP addresses. If the IP address 402 is included in the list, the module 104 may further analyze the third domain 412 to determine whether or not the third domain 412 is malicious. The results of the analysis of the third domain 412 may be transmitted to the server 106 and stored in the database 110. The results may be linked to the IP address stored in the IP address list 112 that matched the IP address 402 serving the third domain 412. As a result, additional information regarding domains served by IP addresses in the list may be stored in the database 110.

The module 104 may also analyze the second domain 408 and the first domain 404 to determine whether these domains are malicious. The domains 404, 408 may be analyzed because the IP address 402, which is hosting these domains, was determined to be included in the IP address list 112. In one configuration, the blocking module 206 may block the end point 414 from occurring if the third domain 412, the second domain 408, or the first domain 404 is determined to be malicious. For example, the blocking module 206 may block sensitive information from being transmitted from the third domain 412 to a device assigned to the IP address 402. The blocking module 206 may also block or prevent a file from being downloaded to the client device 102 via the third domain 412, and the like.

Figure 5:
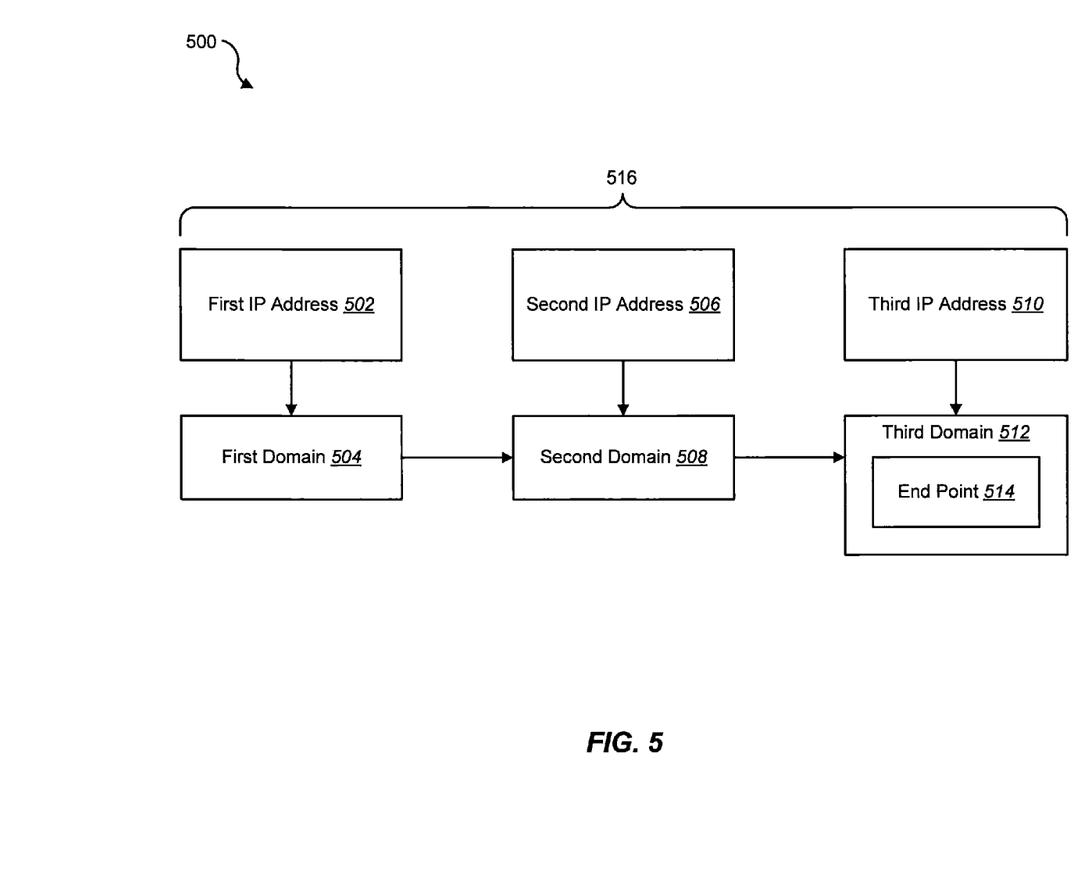
FIG. 5 is a block diagram illustrating one embodiment of a chain of events including a number of IP addresses.

FIG. 5 is a block diagram illustrating one embodiment of a chain of events 500 including a number of IP addresses 516. The chain may be detected by the malicious entity detection module 104 of FIG. 1, 2, or 3. As previously mentioned, an end point 514 may be detected on a domain, such as a third domain 512. An IP address serving the third domain 512 may be identified (e.g., a third IP address 510). In addition, domains previously accessed that led to the third domain 512 may also be identified. For example, a first domain 504 and a second domain 508. IP addresses serving each of these domains may be identified (e.g., a first IP address 502 and a second IP address 506, respectively). The malicious entity detection module 104 may determine whether each IP address 516 included in the chain of events is included in the IP address list 112. When an IP address is found to be on the list 112, additional analysis of the domain that IP address is serving may be performed to determine whether the domain is malicious. If the IP address is not on the list 112, the analysis of the domain served by that IP address may be bypassed.

Figure 6:
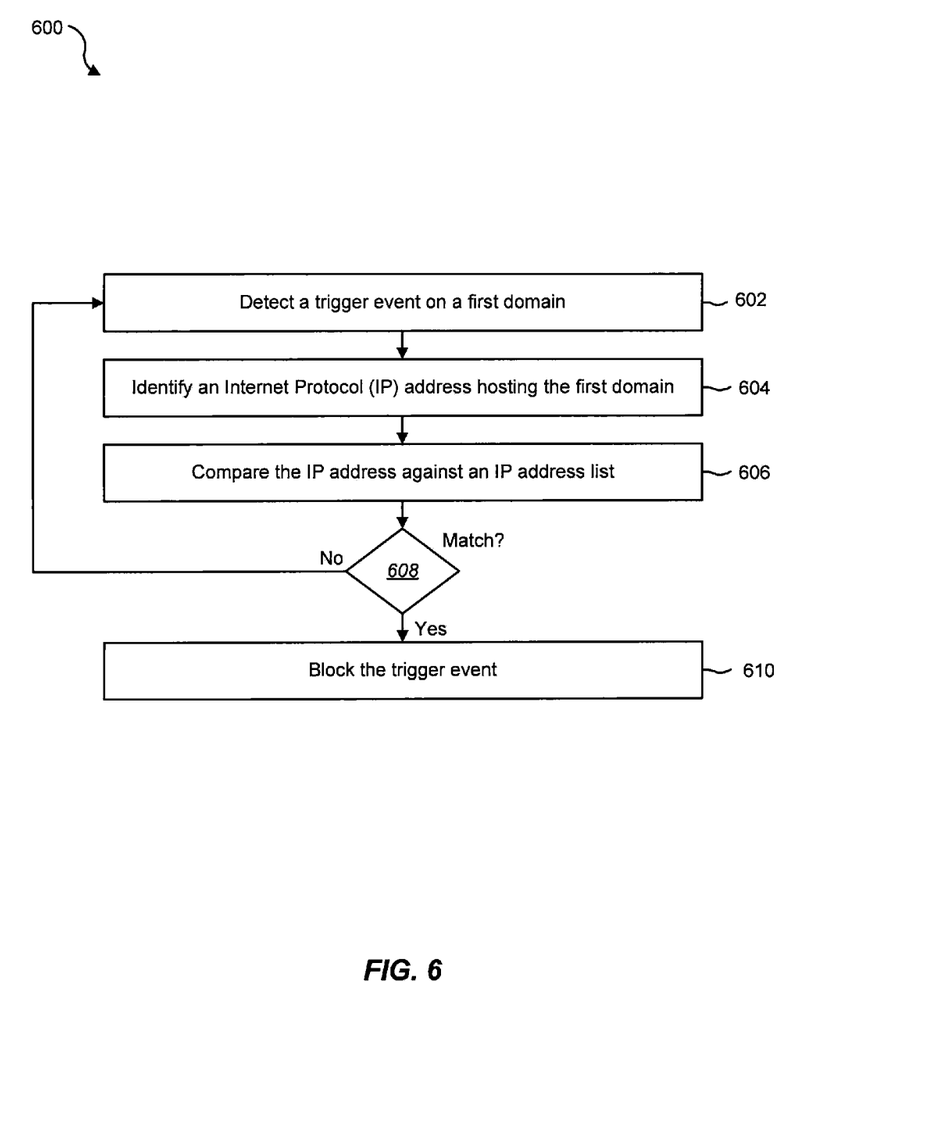
FIG. 6 is a flow diagram illustrating one embodiment of a method to block the occurrence of a trigger event on a domain based on an IP address serving the domain.

FIG. 6 is a flow diagram illustrating one embodiment of a method 600 to block the occurrence of a trigger event on a domain based on an IP address serving the domain. In one configuration, the method 600 may be implemented by the malicious entity detection module 104 of FIG. 1, 2, or 3.

In one configuration, at block 602, a trigger event on a first domain may be detected. The trigger event may be an end point discussed above. At block 604, an IP address serving the first domain may be identified. In addition, at block 606, the IP address may be compared against the IP address list 112. In one embodiment, the IP address list 112 may be generated prior to the identification of the IP address that is serving the first domain. In one example, at block 608, a determination may be made as to whether the identified IP address matches an IP address included in the list 112 of IP addresses. If it is determined that there is no match, the method 600 may return to detect trigger events. If, however, it is determined that the identified IP address matches an IP address in the list 112, at block 610, the trigger event may be blocked. For example, the trigger event may include a request for sensitive information, a file download, a file transfer, and the like. In one configuration, the transmission of sensitive information may be blocked and the file download or transfer may be prevented from proceeding.

Figure 7:
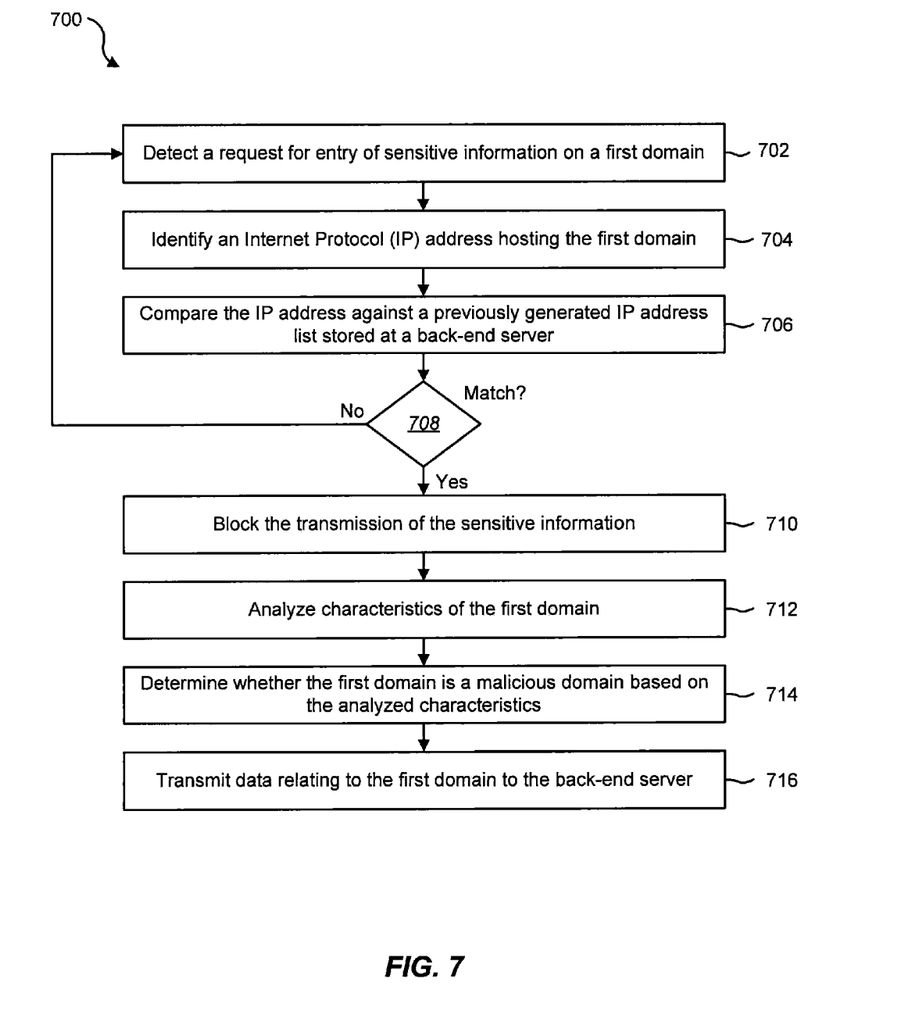
FIG. 7 is a flow diagram illustrating one embodiment of a method to determine whether to perform an analysis on a domain based on the IP address serving the domain.

FIG. 7 is a flow diagram illustrating one embodiment of a method 700 to determine whether to perform an analysis on a domain based on the IP address serving the domain. In one configuration, the method 700 may be implemented by the malicious entity detection module 104.

At block 702, a request for entry of sensitive information may be detected on a first domain. The sensitive information may include financial account information, a credit card number, a social security number, and the like. At block 704, an IP address hosting the first domain may be identified. In one example, at block 706, the IP address may be compared against a previously generated IP address list, such as the list 112 of FIG. 1. In one embodiment, the list may be stored in the database 110, which is in communication with the server 106. In one example, a determination at block 708 may be made as to whether the IP address matches an IP address included in the list 112. If it is determined that there is no match, the method 700 may return to detect requests for sensitive information on the first domain. If, however, it is determined that there is a match, at block 710, the transmission of the sensitive information may be blocked. In addition, at block 712, characteristics of the first domain may be analyzed. For example, heuristics may be used to determine, at block 714, whether the first domain is a malicious domain based on the analyzed characteristics. At block 716, data relating to the first domain may be transmitted to the back-end server, such as the server 106. For example, data indicating that the first domain is malicious may be sent to the server 106.

Figure 8:
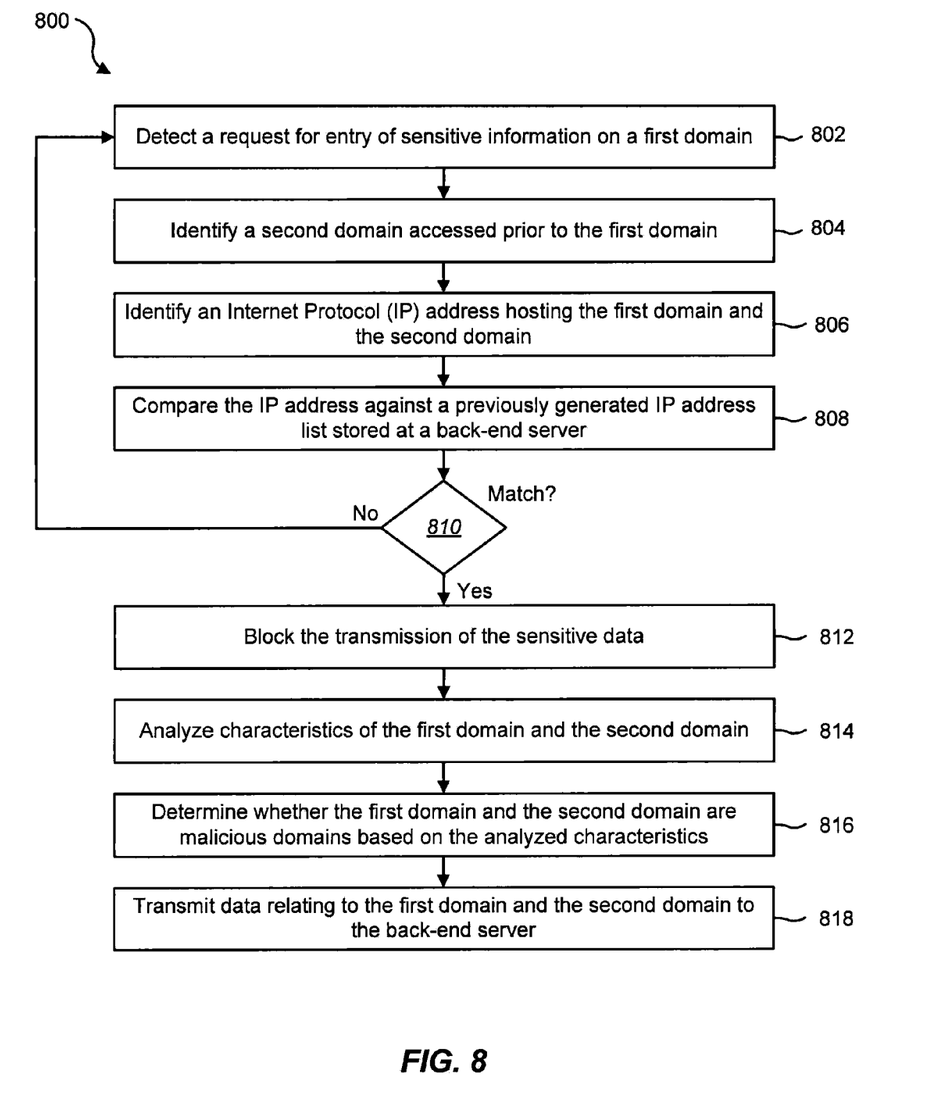
FIG. 8 is a flow diagram illustrating one configuration of a method to determine whether to perform an analysis on domains in a chain of events based on the IP address serving the domains.

FIG. 8 is a flow diagram illustrating one configuration of a method 800 to determine whether to perform an analysis on domains in a chain of events based on the IP address serving the domains. In one configuration, the method 800 may be implemented by the malicious entity detection module 104.

At block 802, a request for entry of sensitive information may be detected on a first domain. The sensitive information may include financial account information, a credit card number, a social security number, and the like. At block 804, a second domain may be identified. The second domain may have been accessed prior to the first domain. At block 806, an IP address may be identified that is hosting the first domain and the second domain. The same IP address may be hosting both domains, or each domain may be hosted by a separate IP address.

In one example, at block 808, the IP address(es) may be compared against a previously generated IP address list, such as the list 112 of FIG. 1. In one embodiment, the list may be stored in the database 110, which is in communication with the server 106. In one example, a determination at block 810 may be made as to whether the IP address(es) match an IP address included in the list 112. If it is determined that there is not a match, the method 800 may return to detect requests for sensitive information on the first domain. If, however, it is determined that there is a match, at block 812, the transmission of the sensitive information may be blocked. In addition, at block 814, characteristics of the first domain and the second domain may be analyzed. For example, heuristics may be used to determine, at block 816, whether the first domain and the second domain are malicious domains based on the analyzed characteristics. At block 818, data relating to the first domain and second domain may be transmitted to the back-end server, such as the server 106. For example, data indicating that the first domain and/or the second domain is malicious may be sent to the server 106. In addition, data may be transmitted to a user about the first domain and/or the second domain. For example, a notification may be sent to the user informing the user as to whether the first domain and/or the second domain is malicious.

As a result, the present systems and methods may block malicious domains by determining whether the IP address hosting the domain is included in a list of known suspicious IP addresses. If the IP address is not included in the list, analysis the domain served by the IP address may be bypassed. If, however, the IP address matches an address on the list, extensive analysis of the domain(s) served by the IP address may be executed.

Figure 9:
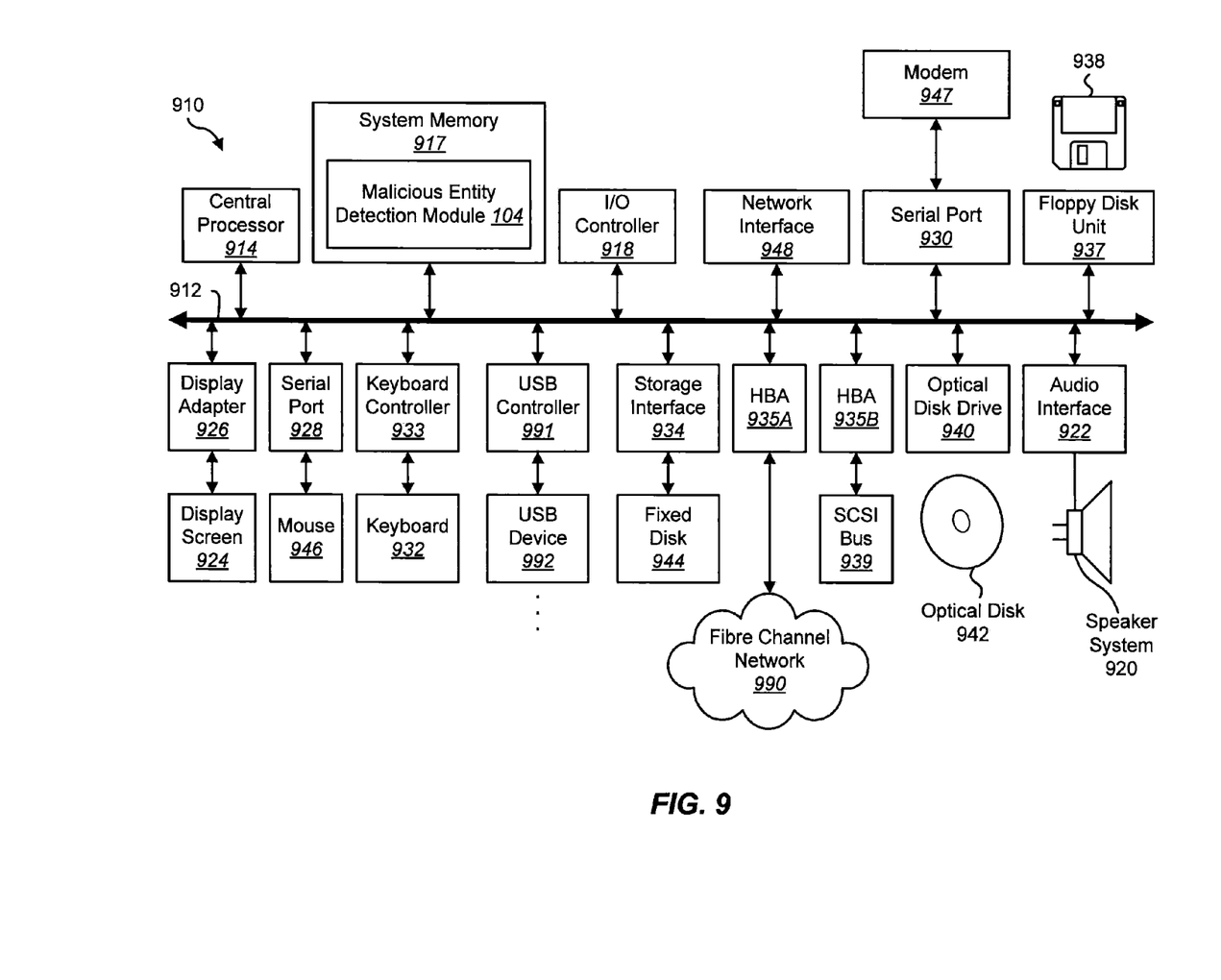
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 991), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malicious entity detection module 104 to implement the present systems and methods may be stored within the system memory 917. Applications resident with computer system 910 are generally stored on and accessed via a non-transitory computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
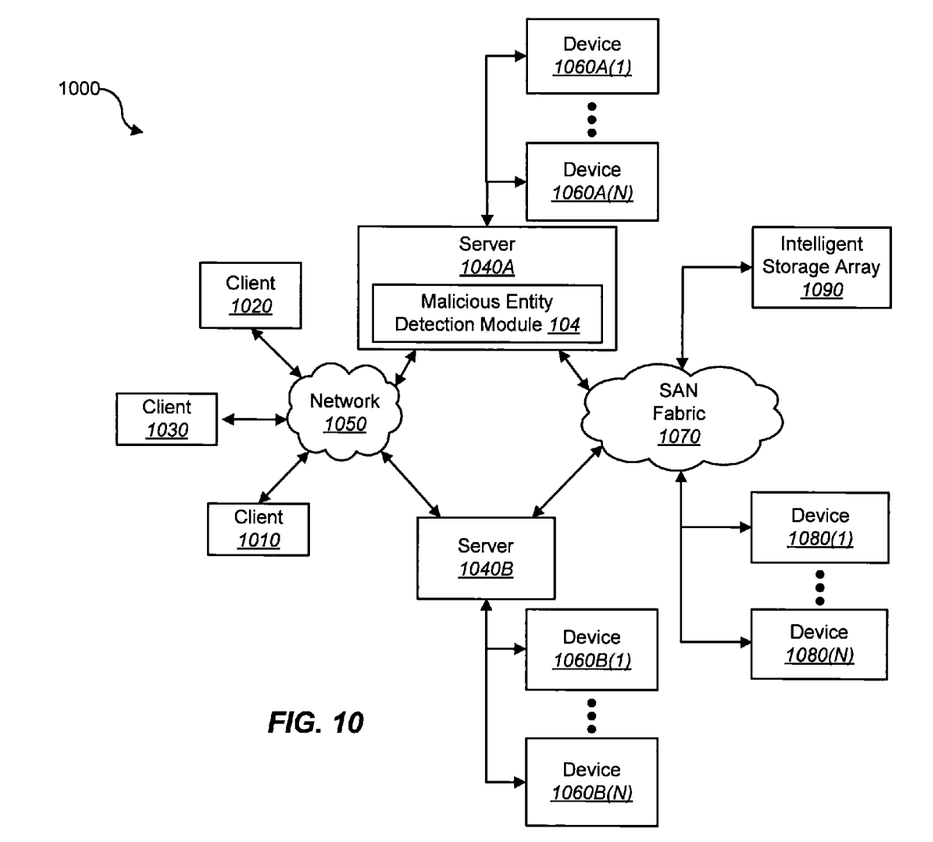
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A, 1040B (any of which can be implemented using computer system 1010), are coupled to a network 1050. In one embodiment, the malicious entity detection module 104 may be located within the storage servers 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A, 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to block a domain based on an Internet Protocol (IP) address serving the domain, comprising:
   detecting a trigger event on a first domain;
   identifying at least one additional domain accessed prior to the first domain;
   identifying the IP address serving the first domain;
   comparing the identified IP address with a list of IP addresses; and
   blocking the trigger event based on a determination that the identified IP address matches at least one IP address on the list.

2. The method of claim 1, further comprising analyzing characteristics of the first domain based on the determination that the identified IP address matches at least one IP address on the list.

3. The method of claim 2, further comprising determining whether the first domain is a malicious domain based on the analyzed characteristics.

4. The method of claim 1, further comprising transmitting data relating to the first domain to a back-end server.

5. The method of claim 4, wherein the data indicate whether the first domain is a malicious domain.

6. The method of claim 1, further comprising generating a notification for a user indicating whether the first domain is a malicious domain.

7. The method of claim 1, further comprising identifying an IP address serving the addition domain and determining whether the IP address matches at least one IP address on the list.

8. The method of claim 7, further comprising determining whether the additional domain is a malicious domain based on a determination that the IP address serving the additional domain matches at least one IP address on the list.

9. A computing device configured to block a domain based on an Internet Protocol (IP) address serving the domain, comprising:
   a processor;
   memory in electronic communication with the processor;
   instructions stored in the memory, the instructions being executable by the processor to:
      detect a trigger event on a first domain;
      identify at least one additional domain accessed prior to the first domain;
      identify the IP address serving the first domain;
      compare the identified IP address with a list of IP addresses; and
      block the trigger event based on a determination that the identified IP address matches at least one IP address on the list.

10. The computing device of claim 9, wherein the instructions are executable by the processor to:
    analyze characteristics of the first domain based on the determination that the identified IP address matches at least one IP address on the list.

11. The computing device of claim 10, wherein the instructions are executable by the processor to:
    determine whether the first domain is a malicious domain based on the analyzed characteristics.

12. The computing device of claim 9, wherein the instructions are executable by the processor to:
    transmit data relating to the first domain to a back-end server.

13. The computing device of claim 12, wherein the data indicate whether the first domain is a malicious domain.

14. The computing device of claim 9, wherein the instructions are executable by the processor to:
    generate a notification for a user indicating whether the first domain is a malicious domain.

15. The computing device of claim 9, wherein the instructions are executable by the processor to:
    identify an IP address serving the addition domain and determining whether the IP address matches at least one IP address on the list.

16. The computing device of claim 15, wherein the instructions are executable by the processor to:
    determine whether the additional domain is a malicious domain based on a determination that the IP address serving the additional domain matches at least one IP address on the list.

17. A computer-program product for blocking a domain based on an Internet Protocol (IP) address serving the domain, the computer-program product comprising a non-transitory computer-readable medium having instructions thereon, the instructions being executable by the processor to:
    detect a trigger event on a first domain;
    identify at least one additional domain accessed prior to the first domain;
    identify the IP address serving the first domain;
    compare the identified IP address with a list of IP addresses; and
    block the trigger event based on a determination that the identified IP address matches at least one IP address on the list.

18. The computer-program product of claim 17, wherein the instructions are executable by the processor to:
    analyze characteristics of the first domain based on the determination that the identified IP address matches at least one IP address on the list, wherein a determination is made as to whether the first domain is malicious based on the analyzed characteristics.

* * * * *